Figure 1:
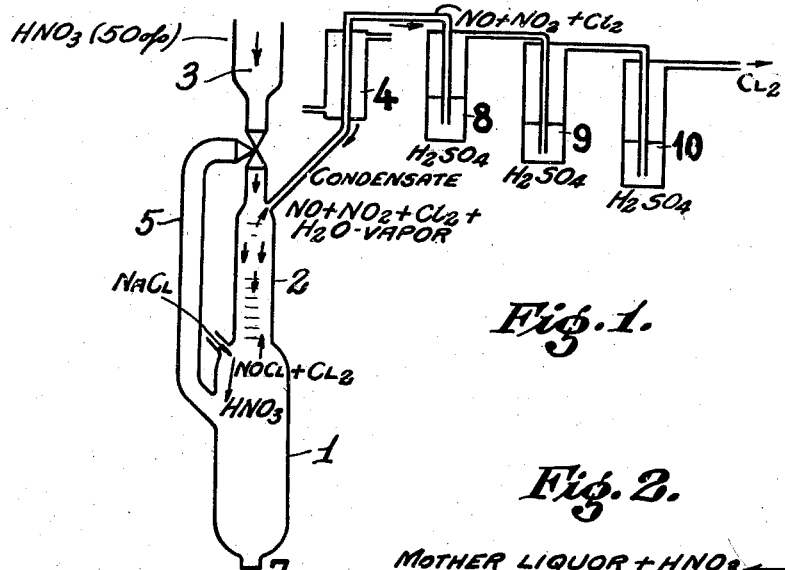

Sept. 7, 1937.  H. TRAMM ET AL  2,092,383
PROCESS FOR THE PRODUCTION OF ALKALI METAL NITRATES BY
REACTION OF ALKALI METAL CHLORIDES AND NITRIC ACID
Filed Sept. 12, 1931

Inventors
H. Tramm:
W. Grimme: by W. E. Evans
Attorney

UNITED STATES PATENT OFFICE

2,092,383

PROCESS FOR THE PRODUCTION OF ALKALI METAL NITRATES BY REACTION OF ALKALI METAL CHLORIDES AND NITRIC ACID

Heinrich Tramm, Oberhausen-Holten, and Walter Grimme, Oberhausen-Sterkrade-Nord, Germany, assignors to Ruhrchemie Aktiengesellschaft, Oberhausen-Holten, Germany Application September 12, 1931, Serial No. 562,528
In Germany September 22, 1930

10 Claims. (Cl. 23—102)

For the manufacture on a large scale of alkali nitrates it has been customary to use preferably carbonates. As these carbonates do not occur naturally, their manufacture presupposes a complicated series of operations which begin exclusively with chlorides and convert the latter into carbonates by the known process of Leblanc or Solvay. Thus, in order to convert natural chlorides into the nitrates which are valuable in the fertilizer industry it has been hitherto compulsory in practice to take the roundabout path by way of the carbonates. When the carbonates are converted there are produced large quantities of carbonic acid which have been rendered impure by the presence of water vapour and nitrogen oxides and which increase the practical work of carrying out the process. It has also been attempted to make direct use of alkali chlorides, which are available in any quantity. Hitherto no one has succeeded in effecting this conversion to a satisfactory extent by the use of nitric acid. It is desirable when converting to make full use of the nitric acid and at the same time to secure in the elemental form the chlorine contained in the chlorides and to make use of it. The two conditions, namely, (1) the conversion with practically no loss of the nitric acid introduced into the form of nitrate or the regeneration of the nitric acid, and (2) the complete conversion of the chlorine introduced into pure chlorine, are fulfilled in the process which is hereafter described.

The importance of the process of the invention lies in the simple manner of producing the valuable alkali nitrates from the readily accessible natural chlorides by fully utilizing the nitric acid and at the same time making full use of the chlorine content. The process is characterized by treatment by the action of the nitric acid on conversion gases containing chloride. For the treatment of the conversion gases a larger quantity of nitric acid is employed than is needed for the conversion of the chlorides. The hydrochloric acid contained in its primary condition in the conversion gases forms with the excess nitric acid, with practically no residue, a mixture of chlorine and nitrosyl-chloride according to the formulae (a) $3NaCl + 3HNO_3 = 3HCl + 3NaNO_3$
(b) $3HCl + HNO_3 = NOCl + Cl_2 + 2H_2O$

In order to secure the chlorine contained in these gases in the form of free chlorine it has been found advantageous to atomize nitric acid in the presence of the gases as they are produced. It is advantageous first of all to separate from the conversion gases practically all the water carried over. Sulphuric acid is then caused to react on the conversion gases, whereupon, by a suitable method, the compounds of nitrogen and oxygen contained in the nitrosyl-sulphuric acid content are rendered useful for the process with practically no residue, this being effected, for example, in such form that the compounds of nitrogen and oxygen are converted into nitric acid and so reintroduced into the process. The conversion of the gases and the treatment with nitric acid are carried out advantageously at a high temperature, for example, at a temperature above 100° C. The action is thus one in which practically the whole chlorine of the nitrosylchloride is converted into elemental chlorine. The process operates without loss of valuable nitric acid; this result is secured by employing at the commencement of the process an excess of nitric acid which is small in relation to the quantity passing through and which remains in part during the process and in part is reformed by means of a quantity of sulphuric acid that has been once determined upon. This small excess of nitric acid does not need, apart from small obvious losses, to be supplemented any more than does the sulphuric acid employed which is used preferably in concentrations of over 50%. Concentrations of over 50% are selected for the reason that the compounds of nitrogen and oxygen formed can be absorbed more easily by the aid of such a concentration. When higher temperatures are employed for converting the alkali chloride it is not possible for the reaction to proceed in an undesired manner as the nitrogen oxides produced from the conversion gas are removed by treatment with sulphuric acid and reconverted into nitric acid quantitatively by the method indicated. The absorption of nitrogen oxides in sulphuric acids proceeds with the formation of nitrosyl sulphuric acid and the extraction of nitric acid from the latter is effected in the following manner, that is to say, an excess of nitric acid which is small in relation to the throughput is employed at the commencement of the process. The part converted during the process into nitrosyl chloride is broken up into nitrogen oxides and chlorine by means of a spray of nitric acid. The conversion gases produced are, as hereinbefore described, converted in known manner with sulphuric acid, thereupon the sulphuric acid containing nitrogen oxides is in known manner freed from the nitrogen oxides by the operation of adding water or by the application of heat or by both steps. The nitrogen oxides are converted into nitric acid in known manner by absorption with water. It thus follows that the part converted into nitrosyl chloride during the conversion of the alkali chloride with nitric acid is converted almost completely back into nitric acid so that there is practially no loss of valuable nitric acid in the process. The denitration of the sulphuric acid employed for the absorption of nitrogen oxides may be effected by means of water and air, whereupon the nitric acid and the sulphuric acid are separated. For the treatment with sulphuric acid ordinary temperature as well as elevated temperatures may be employed. With a high concentration it is possible to secure good lixiviation even at temperatures of over 100° C. Accordingly the chlorine of the chloride introduced in to the process can be obtained in practice in the form of valuable elemental chlorine by correspondingly carrying out the conversion, while at the same time utilizing in the best possible manner the nitric acid for forming nitrate.

Solid sodium nitrate is produced from the hot solution obtained in the process by introducing nitric acid and salt in equivalent proportion to the solution which has been saturated while hot. The solution saturated while hot is drawn off at some other point, evaporated, and cooled while at a third point the mother liquor, containing nitric acid and from which the nitrate has been separated out, is passed back into the conversion vessel. By this method the excess of nitric acid required is maintained constant. By suitable regulation the excess of nitric acid can be so selected so that either chlorine or hydrochloric acid is left in the residual gas, as desired.

It is to be observed that the nitrogen oxides produced during the process consist of a mixture of nitrogen monoxide and nitrogen peroxide ($NO_2$).

Apparatus for carrying out the process according to the invention is diagrammatically illustrated by way of example in the accompanying drawing.

The following are examples of methods of carrying out the process:

Example 1

At the commencement of the experiment 100 gr. of NaCl are introduced in solid form through the pipe 6 (Figure 1) into a heated vessel 1, while 800 gr. of a 50% nitric acid is allowed to pass in from the vesel 3 by way of the atomizing column 2. The conversion gases leaving the vessel 1 consist substantially of equal parts of chlorine and nitrosylchloride in addition to water vapour. They also contain traces of hydrochloric acid. The atomization of the nitric acid in the column 2 causes the nitrosylchloride to be converted into elemental chlorine and nitrogen oxides. The hydrochloric acid is converted in accordance with the formula b, one molecule of NOCl and one molecule of $Cl_2$ being produced by the action of one molecule of nitric acid on three molecules of hydrochloric acid. In the cooling vessel 4 the water vapour is condensed, and then the nitrogen oxides are lixiviated, while nitrosylsulphuric acid is being formed in the adjacently disposed washing vessels 8, 9, 10, by means of 90–100% sulphuric acid. The issuing gas consists of practically pure chlorine. The nitrosylsulphuric acid is decomposed to form nitrogen oxides and sulphuric acid; the nitrogen oxides are converted into nitric acid and reintroduced into the process. The lye containing nitrate is drawn off through the cock 7 and after evaporation is reduced to an acid concentration of about 50% and separated from the nitrate which separates out during cooling. The mother liquor is returned to the vessel 1, into which, now that the excess acid from the 800 gr. of acid first introduced is available, a further 100 gr. of NaCl and about 300 gr. of a 50% nitric acid—that is to say NaCl and nitric acid in equivalent proportions—are introduced.

It is particularly advantageous to bring the reaction gases in contact with nitric acid at temperatures lying preferably above 100° C. and with concentrations of the acid of over 40%.

It has been found that it is not necessary to take pure nitric acid but that the conversion gases can be completely converted into elemental chlorine on the one hand and nitrogen oxides on the other hand by washing with liquids containing nitric acid.

It has also been found in practice to be particularly useful to introduce into the conversion vessel the liquid employed for washing the reaction gases in order to be able to utilize the liquid. For this purpose the said washing liquid is passed out of the vessel 3 into the atomizing column 2, whence is flows directly into the conversion vessel 1. It has been found very effective to employ as the liquid to be atomized the mother liquor which results from the separating out of the solid nitrate, after first heating and adding, if desired, the nitric acid required to form the nitrate. Furthermore, the process may be so carried out that the conversion gases are treated in two stages, for example, in the first stage with the mother liquor containing nitric acid and in the second stage with the fresh nitric acid. Furthermore, it has been found to be an advantage to return directly to the conversion vessel the condensate separated out by reflux condensation from the conversion gases.

It is furthermore particularly advantageous to effect the conversion of the chlorides in a number of stages and for this purpose the washing liquid or the condensate is so conveyed that it flows into the vessel in which the first conversion takes place, its return into the further reaction vessels being prevented. It has been found that when performing such an operation the chlorine is in practice removed very thoroughly, in fact almost completely from the conversion liquid, while if the liquid be allowed to return into the vessels for further conversion these cannot be obtained practically free from chlorine. Thus, with this step means are available for obtaining conversion lye practically free from chlorine by conversion of the chloride, whereby the evaporation of this liquid is very much facilitated as at the present day substances are available by which solutions of nitric acid can be evaporated, but it is scarcely possible to secure substances that are resistant to hot solutions of nitric acid which contain chloride, and at the same time have a good heat conductivity. The conversion vessels may be so constructed in the multi-stage conversion that they consist of a vessel divided by means of suitable partition walls or bottoms into a number of chambers. In order to remove the nitrate from the mother liquor it has been found advantageous to remove the water which is introduced with the nitric acid outside the actual conversion vessel under conditions, as by the use of a suitable rectifying column, such that the water being distilled is practically free from nitric acid while the evaporated liquid contains practically the whole of the excess nitric acid at a concentration which is greater than that of the unevaporated conversion liquor.

It has been found particularly advantageous to add the nitric acid to the chloride; to wash the conversion gases, to evaporate the conversion solution and separate out the nitrate formed in such manner that a continuous cycle of operations results in which excess of nitric acid persists while the nitric acid consumed for the whole conversion is being continuously replaced. It has been found that this continuous operation enables the total conversion to be carried out very uniformly.

It is known to wash nitrogen oxides from gases by means of sulphuric acid. It has been found that in connection with the present process nitrogen oxides can be completely washed from the chlorine by means of highly concentrated sulphuric acid while cooling to temperatures of about plus 10° C. to plus 20° C. without any quantities of chlorine being dissolved in the sulphuric acid. The nitric acid obtained from the nitrous sulphuric acid is practically free from chlorine. The gas mixture which is obtained by spraying with nitric acid the conversion gases which are produced by the action of excess nitric acid on chlorides contains nitrogen monoxide (NO) and nitrogen peroxide ($NO_2$) approximately in equal molecular quantities. It has been found to be advantageous to add to this mixture any desirable quantities of $NO_2$.

By carrying out the process hereinbefore described, practically all the chlorine in the chlorides can be obtained as free chlorine.

It has been found that with a very considerable excess of nitric acid the oxidizing action of the conversion solution is so great that the special washing of the conversion gases can be dispensed with and that the chlorine is obtainable directly from the conversion solution in the form of elementary chlorine. It has also been found possible to secure the chlorine contained in the conversion gases almost completely in the form of free chlorine by adding nitrogen oxides in the form of vapour or liquid to the conversion gases in the presence of water. Alternatively dilute nitric acid may be added to the conversion gases in the presence of water.

Example 2

Figure 2:
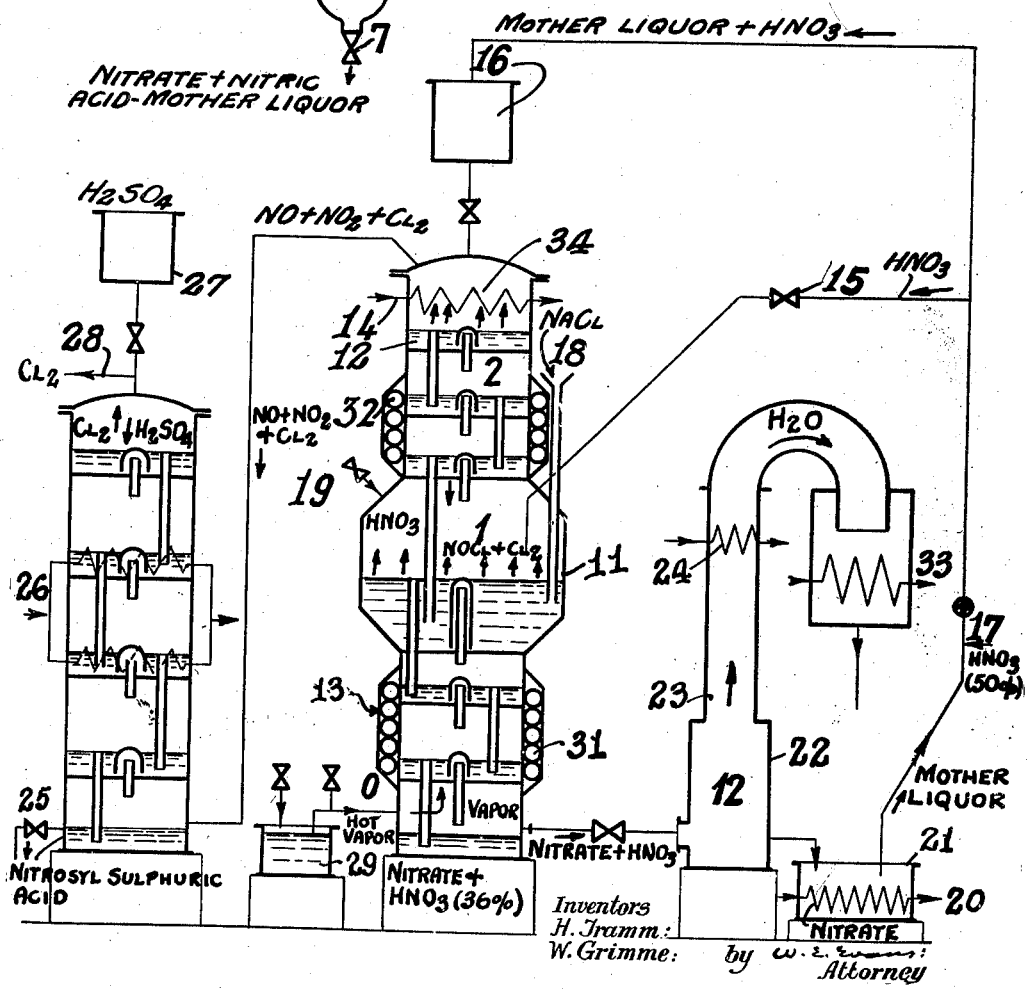

Common salt and 50% nitric acid are brought into reaction in the main reaction vessel 11 (Figure 2), so that to every kg. of NaCl 8 litres of 50% nitric acid are used. The salt is introduced through the pipe 18, the nitric acid enters through the immersion column 12 so that the reaction gases generated in the vessel 11 are washed by the acid flowing in the opposite direction. The acid is heated to temperatures above 100° C. by an external heating apparatus 32, by steam blown in at 19, or by the vapours ascending from the reaction vessel.

The condensing coil 14 is provided in the upper part of the column, the reaction gases issuing from the conversion and washing vessels 11 and 12 being freed from any water vapour that may be conveyed in them. The condensate returns to the column.

The principal part of the chloride introduced is converted in the vessel 11, chlorine and nitrosyl chloride being evolved. The conversion ceases as the reaction liquid flows down over the bottoms of the column 13. The reaction gases and vapours evolved on these bottoms combine on ascending with the main conversion gases from vessel 11 and simultaneously are treated in the same way as the latter.

The column 13 is heated to temperatures lying between 90° C. and 100° C. by an external heating apparatus 31 or by water vapour or nitric acid vapour blown in at 30, generated in the vapour generator 29.

The solution which falls from the lowermost bottom of the reaction column 13 is practically free from chlorine and contains 36% nitric acid in addition to sodium nitrate. This liquor is drawn off into the distilling vessel 22, where, by means of a suitable rectifying column 23, a dephlegmator 24, and a cooler 33, water is distilled off without loss of nitric acid, until the residue again contains approximately 50% nitric acid. This enriched liquor is cooled in the vessel 21 provided with the cooling coil 20, 1.4 kg. of sodium nitrate being crystallized for every kg. of salt. After removing the solid salt the mother liquor is returned to the process, being pumped through the ascension pipe 16 to the column 12. The mother liquor is mixed with fresh nitric acid from the pipe 17 until 8 litres of acid are available for addition to each kg. of salt.

The reaction gases, which, after leaving column 12 consist of a mixture of approximately equal parts by volume of chlorine and nitrogen oxides are washed in the washing column 25 with 94% sulphuric acid, the nitrogen oxides being absorbed in the form of nitrosyl sulphuric acid while all the chlorine from the salt is obtained in elementary form. The heat generated during absorption can be removed by means of the cooling apparatus 26.

The parts of the apparatus are made of ceramic and metallic material which is impervious to acid.

Example 3

18 litres of 50% nitric acid are passed through the tube 15 (Figure 2) and are added to 1 kg. of common salt which has been introduced through the pipe 18 into the reaction vessel 11. By heating the solution to boiling point all the chlorine already in the vessel flows out in elementary form in admixture with nitrogen oxides. The spraying of the reaction gas in column 12 with nitric acid may be dispensed with. The further treatment of the liquor and gas mixture is carried out as in Example 2.

Example 4

1 kg. of common salt is converted in vessel 11 (Figure 2) and in column 13 with 5 litres of 50% nitric acid which enters through column 12. A mixture of water vapour and nitrogen oxides is blown through the cock 19 into the reaction gas evolved which is composed of approximately equal parts of chlorine and nitrosyl chloride before passing into the washing column 12. By this means all the chlorine in the final gas is obtained in elementary form while the added nitrogen oxides formed in the washing column are absorbed in the sulphuric acid.

The conversion gases produced by the reaction between excess nitric acid and chlorides are first brought into intimate contact with atomized nitric acid, advantageously in a high degree of concentration, at high temperatures in the manner hereinbefore described. The gases thus treated are now intimately mixed for example with 94% sulphuric acid at 40° C., advantageously in a countercurrent immersion column or a similar suitable absorption device. This causes the sulphuric acid to combine with the nitrogen oxides in the gas mixture in the form of nitrosyl sulphuric acid. If the process is carried on at low temperatures, solid nitrosyl sulphuric acid is separated out from the sulphuric acid and chokes the column or absorption device. To obtain economical de-nitration, concentration of the nitrogen oxides in the sulphuric acid must be carried to as high a degree as possible; it is practically impossible to avoid a residue of nitrogen oxides breaking through the sulphuric acid, which would be extremely undesirable in the further treatment of the chlorine. Furthermore, there still remain small quantities of hydrochloric acid vapours and nitric acid vapours in the conversion gases.

It has been found advantageous to subject the gases produced by this conversion to further treatment with sulphuric acid, with or without water, under pressure. By this means the sulphuric acid completely converts the nitrogen-oxygen compounds still in the residual gas into nitrosyl sulphuric acid, so that the whole of the compounds can be rendered of use again for splitting up chloride. By further treatment with water a very pure chlorine is obtained as the water removes the hydrochloric acid and any nitric acid which may have passed through the sulphuric acid. Chlorine thus obtained is particularly suitable for the purpose of chlorinating, more particularly for chlorinating sensitive compounds.

The method just described of carrying out the process according to the invention is here illustrated by means of two examples.

Example 5

In the reaction between 1 kg. of common salt and 8 litres of 50% nitric acid carried out at boiling point, 250 litres of a gas mixture are evolved which consists of approximately equal parts of chlorine and nitrosyl chloride. After the gas mixture has been very thoroughly washed in hot sprayed nitric acid, the water vapour is removed from the reaction gas given off, the gas then being composed of 190 litres of chlorine and 80 litres of nitrogen oxides, principally nitrogen monoxide and nitrogen peroxide ($NO_2$). Treatment of this gas with 6 litres of 94% sulphuric acid very thoroughly washes out the nitrogen oxides while at the same time forming nitrosyl sulphuric acid, so that the chlorine given off contains only a further 2% by volume of nitrogen oxides. To remove these traces of nitrogen oxides, which is possible only with large quantities of 94% sulphuric acid, the gas issuing from the washing vessel in the front part of the apparatus illustrated in Figure 1, is first compressed to 3 atmospheres by a compressor (not illustrated). The gas is then passed through the washers 9 and 10 wherein it is washed with 1 litre of 100% sulphuric acid. By this means the chlorine is freed, before being liquefied, from the last traces of nitrogen oxides by further compression.

Example 6

The chlorine obtained as described in Example 5, may still contain small quantities of hydrogen chloride after it has been washed with sulphuric acid. In order to remove this impurity 1 litre of 100% sulphuric acid is placed in the washer 9 of the apparatus employed for Example 5 and 1 litre of water is placed in the washer 10. The gas, which issues from the washer 9 under a pressure of 3 atmospheres, is washed with water in the washer 10. After this treatment the chlorine is obtained in a very pure condition.

The process can be very advantageously carried out by also putting into the reaction vessel the saturated nitrosyl sulphuric acid used for washing out the nitrose from the chlorine. A mixture of sulphuric acid and nitric acid is obtained, which contains chloride in the form of nitrate. The nitrose in the sulphuric acid escapes into the solution, being split up as the sulphuric acid is introduced.

We claim:

1. A process for the production of alkali nitrates by the action of nitric acid with reformation of the nitric acid, consisting in converting alkali chlorides by the action of nitric acid into nitrates and forming a reaction gas mixture comprising chlorine and nitrosyl chloride, decomposing the nitrosyl chloride into nitrogen oxides and chlorine exclusively by the action of an excess of hot nitric acid, separating out practically the whole of the water vapour content of the resulting gas mixture, extracting the chlorine from the said resulting gas mixture and absorbing the nitrogen oxides in sulphuric acid of a concentration of more than 50%, decomposing the solution of nitrogen oxides in sulphuric acid, and reforming nitric acid from the liberated nitrogen oxides.

2. A process for the production of alkali nitrates by the action of nitric acid with reformation of the nitric acid, consisting in converting alkali chlorides by the action of nitric acid into nitrates and forming a reaction gas mixture comprising chlorine and nitrosyl chloride, decomposing the nitrosyl chloride into nitrogen oxides and chlorine exclusively by the action of an excess of hot nitric acid, separating out practically the whole of the water vapour content of the resulting gas mixture, extracting the chlorine from the said resulting gas mixture and absorbing the nitrogen oxides in sulphuric acid of a concentration of more than 50%, decomposing the solution of nitrogen oxides in sulphuric acid, and reforming nitric acid from the liberated nitrogen oxides, separating the nitrates from the saline mother liquor and returning the reformed nitric acid together with the nitric acid of the saline mother liquor for the treatment of fresh quantities of alkali chloride.

3. A process for the production of alkaline nitrates, consisting in converting alkali chlorides by the action of nitric acid into nitrates and forming a reaction gas mixture comprising chlorine and nitrosyl chloride, atomizing liquids containing nitric acid and of a concentration of more than 40% at raised temperatures, and directly spraying the reaction gas mixture with said nitric acid containing liquid for the decomposition of the nitrosyl chloride of the said mixture into nitrogen oxides and chlorine, and separating the nitrates, chlorine and nitrogen oxides.

4. In a process according to claim 1, separating the nitrates from the concentrated saline mother liquors and atomizing the said mother liquors directly in the presence of the reaction gas mixture.

5. In a process according to claim 1, separating the nitrates from the concentrated saline mother liquors, adding a quantity of fresh nitric acid corresponding to the nitric acid consumed in the formation of the nitrates to the concentrated saline mother and atomizing the mixture directly in the presence of the reaction gas mixture.

6. In a process according to claim 1, effecting the conversion in a vessel connected to a washing chamber, washing the reaction gas mixture in the said chamber and passing the used washing liquid containing nitric acid into the conversion vessel.

7. In a process according to claim 1, washing the reaction gas mixture from the conversion vessel with hot liquid containing nitric acid, subjecting the gas mixture to the action of a cooling device suitable for retaining the water vapour contained in the gas mixture, removing the contained water vapour from the gas mixture, bringing the gas mixture into intimate contact with atomized sulphuric acid and returning the resultant condensate to the conversion vessel.

8. In a process according to claim 1, effecting the conversion of the alkali chlorides with an excess of nitric acid in stages in a number of vessels, and passing the liquids resulting from the intimate admixture with atomized nitric acid and reflux condensation into the main conversion vessel without direct entry into the subsequent conversion vessel, and passing the reaction gas mixture generated in the subsequent conversion vessels first through the main conversion vessel and thence, in common with the reaction gas mixture generated in the main conversion vessel, into intimate contact with atomized liquids containing nitric acid.

9. In a method of carrying out the process according to claim 1, effecting evaporation of the water from the liquor from the conversion vessel and rectifying the vapors to condense the nitric acid, and to retain in the remaining liquid practically the whole excess nitric acid at a concentration which is greater than that of the unevaporated conversion liquor.

10. A process for the production of alkaline nitrates, consisting in converting alkali chlorides by the action of nitric acid into nitrates and forming a reaction gas mixture comprising chlorine and nitrosyl chloride, atomizing liquids containing nitric acid and of a concentration of more than 40% at a temperature of over 100° C. and passing the said atomized liquids directly into contact with the said reaction gas mixture by spraying, thus decomposing the nitrosyl chloride into nitrogen oxides and chlorine, and separating the nitrates, chlorine and nitrogen oxides.

HEINRICH TRAMM.
WALTER GRIMME.